June 9, 1936. W. T. WELLS 2,043,401
SUPPORTING AND CONDUCTING CABLE AND METHOD OF CONSTRUCTING THE SAME
Filed July 7, 1934
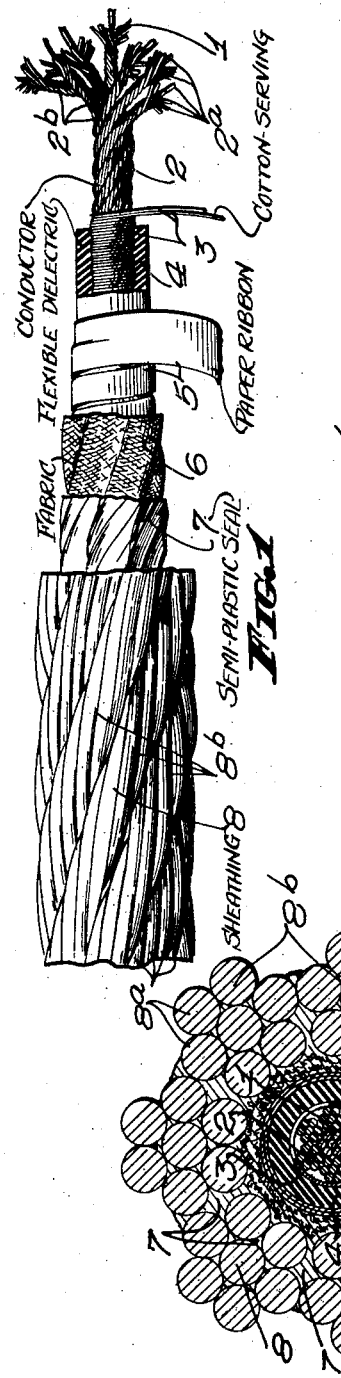
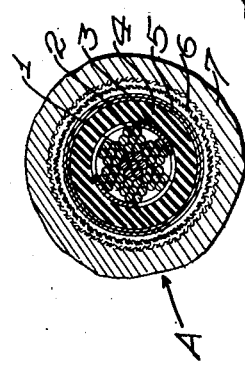
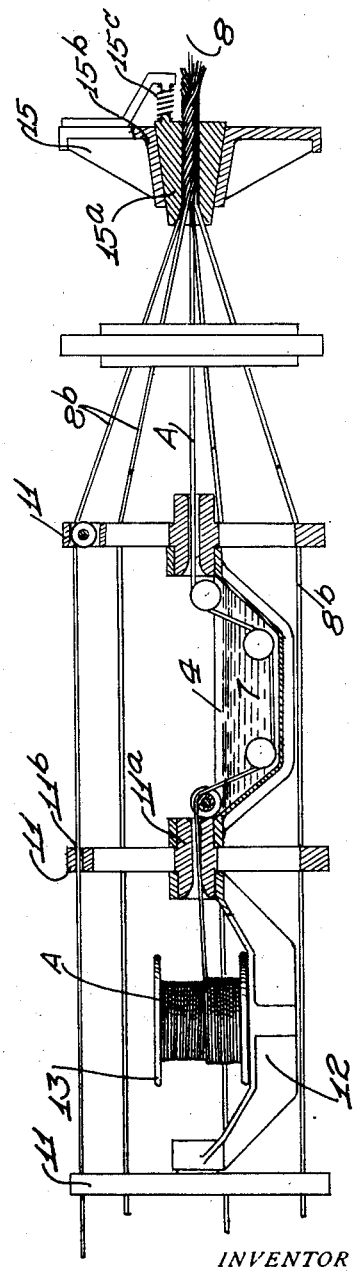
INVENTOR
WALTER T. WELLS
BY
*Lloyd Spencer*
ATTORNEY Patented June 9, 1936

2,043,401

UNITED STATES PATENT OFFICE 2,043,401

SUPPORTING AND CONDUCTING CABLE AND METHOD OF CONSTRUCTING THE SAME

Walter T. Wells, Glendale, Calif., assignor to The Technicraft Engineering Corporation, Los Angeles, Calif., a corporation of California Application July 7, 1934, Serial No. 734,169

19 Claims. (Cl. 173—266)

My invention relates to supporting and conducting cables and the method of constructing the same, and the objects of my invention are:

First, to provide a cable of this class which is particularly adapted to pass an electric current while under a material tensional load and submerged to great depths;

Second, to provide a cable of this class which is designed to operate electric tools in oil wells and to withstand both the heat and excessive pressures encountered therein;

Third, to provide a cable of this class which is capable of withstanding excessive tensional loads without injury to the electric conductor therein, such as the loads necessary in order to retrieve a tool carried by the cable should it become lodged in the well;

Fourth, to provide a cable of this class which is fully as flexible as conventional cable of the same diameter so that it can be passed around drums, sheaves etc., without injury;

Fifth, to provide a cable of this class in which the electric conductor is at all times practically free of tensional stresses even though the weight supporting portion of the cable is subjected to heavy loads yet said conductor is capable of lengthening and contracting with the weight supporting portion;

Sixth, to provide a cable of this class which incorporates a novel binder compound of a semi-plastic nature between the weight supporting portion and the conductor portion of the cable which insures adequate sealing of the conductor portion against the entrance of water or the like even under excessive pressures;

Seventh, to provide a method of constructing a cable of this class which involves a novel manner of forcing the protective binder compound into an underlying fabric and around the overlying weight supporting strands of the cable;

Eighth, to provide a method of constructing a cable of this class wherein the conductor is dead annealed to provide extreme flexibility and is so wound with respect to the weight supporting portion of the cable as to be subjected to compression rather than tension stresses along its length upon stretching of the cable under load, whereby the possibility of stretching the conductor under load and the resulting kinking of the conductor when the load is removed and attendant danger of failure at the points of kinking is eliminated;

Ninth, to provide a novel and particularly economical method of manufacturing a cable of this class particularly suited to construction on substantially standard cable manufacturing machines; and To provide on the whole a novelly constructed supporting and conductor cable which is economical and simple of manufacture proportional to its functions, durable, efficient in its action and which will not readily deteriorate or get out of order.

With the above and other objects in view as may hereinafter appear, attention is directed to the drawing, in which:

Figure 1 is a fragmentary elevational view of a supporting and conductor cable embodying my invention with laminae broken away successively to illustrate the composite structure; Figure 2 is an exaggerated and diagrammatic typical transverse sectional view of the cable as completed; Figure 3 is a similar view illustrating the core and its covering of semi-plastic material before the weight supporting strands are wound thereon; and Figure 4 is a fragmentary diagrammatic view of a cable weaving machine as it is modified to carry out my novel method of manufacture.

This application is a continuation in part as to all common subject matter of my application Serial No. 662,901, filed March 27, 1933.

My cable is built up around a center member 1 which is formed of copper, cotton string or the like. The center member has no particular function in the finished cable but serves as a base around which the cable is formed.

A conductor 2 is applied around the center member 1. Said conductor is preferably formed of copper and comprises a plurality of wires 2a wound into groups of strands 2b. The lay of the wires 2a is in the opposite direction to the lay of the strands 2b, and the lay of the strands is relatively short and slightly loose whereby the conductor is constrictible longitudinally.

The conductor is wrapped helically with a serving 3 of cotton or the like. A wall of flexible dielectric 4 such as rubber is moulded or otherwise formed around the serving 3. The dielectric is wrapped with a ribbon 5 or the like formed of paper, tape or any suitable material.

Braiding 6 of cotton or other suitable material is then woven around the ribbon 5 and may comprise one or more layers. The braiding is coated with semi-plastic material 7 which will be described in more detail hereinafter.

A weight supporting sheathing 8 in the nature of a wire rope structure is provided around the material 7. Said sheathing comprises a plurality of wires 8a, wound into strands 8b. The lay of the wires 8a is reverse to the lay of the strands 8b. The lay of the strands 8b is in the same direction as the lay of the strands 2b of the conductor 2; furthermore, the lay of the strands 2b is less than the proportional difference between the diameter of the conductor and the diameter of the sheathing. In other words, assuming the diameter of the sheathing to be .4375 inch and the lay of the strands about 3.2500 inches, the diameter of the conductor is about .066 inch and its lay about .35 inch. A proportional lay in the conductor would be around .49 inch.

Attention is now directed to Figure 4 which illustrates diagrammatically a cable weaving machine modified to carry out my process of forming the cable. The conventional machine comprises a plurality of wheels 11 supported at their peripheries by any suitable means, not shown, to rotate about a common axis. Suitable cradles, not shown, are suspended between adjacent wheels and weighted so as to remain substantially fixed as the wheels rotate. Each of the cradles supports a wire or strand spool. Strands or wires from several spools are suitably threaded through the wheels so that they pass through guides 11a in the peripheries thereof.

To carry out my method of weaving the cable, a cradle 12 is suspended between a pair of wheels arranged next to the end pair of wheels. A spool 13 is carried thereby and is wound with the core A of the cable comprising the center member 1, conductor 2, serving 3, dielectric 4, ribbon 5 and braiding 6. The core A is threaded through a bore in the hub 11a of the adjacent forward wheel. Between the adjacent or last pair of wheels 11 is hung a tank 14 which is so mounted that it tends to maintain a fixed position as the wheels 11 rotate. The core A is threaded through and over suitably arranged pulleys to pass the core into the tank and thereby dip the core in the contents.

The strands 8b of the sheathing pass through guides 11b in the peripheries of the several wheels 11 to the end wheel where they are directed radially and forwardly to the forming die 15. The forming die 15 is conventional, comprising a plurality of complementary die members 15a defining a bore through which the cable is formed and passed. The resulting periphery of die members is conical and fits in a support 15b with the apex of the cone extending rearwardly and constituting the receiving end. Springs 15c yieldably retain the die members in their rearward position so that they define their smallest die opening.

Between the forming die 15 and last or forward wheel 11, the strands may pass through individual preforming dies of conventional design which imparts a helical twist to each strand corresponding to the desired lay so that several strands fit snugly into each other as they pass into the forming die 15 and are more compact or tighter than the strands of the conductor. The core A is threaded axially into the forming die 15, and said die rotates so as to twist the strands 8b therearound.

With the above construction of the cable and the cable forming machine in mind, attention is directed to the particularly novel steps involved in my process of forming cable.

The conductor is preferably treated so that the copper wires thereof are dead annealed, for this reason the copper center member 1 is preferred, but inasmuch as the center member has no particular function in the finished cable, it may be of cotton or the like and therefore destroyed in the annealing process.

The fabric covered core of the cable is merely dipped in the semi-plastic material 7 as it passes through the tank 14. This merely applies the material 7 around the outside of the fabric as shown in Figure 3. Being of a thick nature and sticky, a considerable quantity of the material adheres to the core. Upon entering the forming die 15, the pressure of the strands 8b force the material 7 into the fabric to completely impregnate the same and at the same time force some of the surplus material in and around the strands and wires of the sheathing.

The wires and strands of the sheathing are first thoroughly pickled to remove all grease and the cable forming machine parts engageable with the strands are likewise cleaned entirely free of grease. This insures proper bond between the sheathing and the semi-plastic material.

In this connection a material having the following specifications has been found most suitable:

Normally semi-plastic to yield to the movements of the cable, but initially more or less plastic to adhere to the core; adhesiveness, particularly for the steel in order to form a proper bond therewith; dense and free of voids after being forced into the fabric and between the components of the sheathing, so that excessive constructional pressures both from the shrinking in the diameter of the sheathing under load and the hydro-static pressure resulting from submergence will not cause the material to give way; capable of withstanding working temperatures, whether from internal friction or surrounding water or the like in the well, without excessive softening, although some softening is permissible; impervious to water, oil and other fluids encountered in oil wells and electric insulative qualities. Such specifications are met in a substance known to the trade as Glyptal, an alkydor glycerolphthalate resin.

In summation, my method of manufacturing the cable consists in winding a conductor with a short lay and slightly loose; the lay of the strands and the wires thereof reversed, then dead annealing the conductor; then wrapping with a serving of cotton or the like; then molding a coating of dielectric material; then wrapping with a ribbon to protect the dielectric material; then weaving braiding thereabout; then applying a normally semi-plastic adhesive material while in a more or less plastic state; then winding tightly therearound a plurality of multiple wire strands so that they exert sufficient pressure to force the semi-plastic material into the fabric until completely impregnated therein, first pickling the sheathing strands to remove grease and other deleterious matter which would prevent forming of a proper bond with the material; and so arranging the lay of the sheathing that it winds in the same direction as the conductor but is greater with respect to the lay of the conductor than the diameter of the cable is with respect to the diameter of the conductor.

Operation of the cable by reason of the relationship between the sheathing and conductor is as follows:

When a load is applied to the cable the sheathing tends to untwist and lengthen and the amount of stretch is proportional to the untwisting action and is dependent upon the length of lay. That is, the shorter the lay, the greater the amount of untwisting and lengthening resulting from a given load. The conductor has the same center as the sheathing and is held within the length thereof against practically all movement relative thereto; hence, the conductor while tending to lengthen a greater amount than the sheathing for a given untwisting movement or stretching thereof is restrained and therefore is subjected to a moderate longitudinal compression force easily compensated for in the slight looseness of the conductor winding.

This is quite important when the conductor is dead annealed to permit repeated bending or flexing without danger of breaking, for such annealing reduces the elasticity of the conductor to a minimum and any stretching of the conductor will result in a permanent increase in length and attendant kinking as it passes over drums or sheaves with danger of failure at those points.

As may be observed from Figure 2, the cable section appears quite similar to a conventional wire rope of the haulage or hoisting type, with the exception that a special conductor core is substituted for the conventional core; and the special core has a stranded conductor wound in the same direction as the wire rope strands. The strands 8 are sufficiently few in number as to have a pronounced "key-stoning" effect. That is, the several strands tend to wedge one against the others and maintain their positions around the core as is the case in conventional wire rope. As the number of strands increase, and the strands occupy less than half the total diameter of the cable, the "keystoning" effect becomes less pronounced with the result that the cable cannot be wound on conventional drums or be fixed repeatedly as is required of my special cable. In fact, tests have shown that the conductor core cable constructed as shown herein fully equals in performance a conventional haulage or hoisting cable of the same diameter and capable of being used in any manner that such a conventional cable or wire rope could be used.

Cable constructed according to the foregoing and having approximately the dimensions given hereinbefore, has withstood 176 runs to an average depth of 5,000 feet at which depth the static load is around 1,800 pounds. During this time it has been necessary to free the equipment used with the cable necessitating a strain between 4,500 and 5,500 pounds in addition to the static load. The cable is still in service with no signs of deterioration. Specimens taken from the extended end of the cable have shown that the semi-plastic material is completely impregnated in the fabric and no deleterious matter has reached the fabric much less the ribbon wrapping and dielectric or rubber insulation. The conductor appears free of kinks or other indication of being subjected to a tensional load.

I claim:

1. A supporting and conducting cable comprising; a multi-stranded conductor; a multi-stranded sheathing therearound; the lays of the conductor and sheathing extending in the same direction; a yieldable dielectric embracing the conductor and within the sheathing; a fabric interposed between the dielectric and sheathing; and a semi-plastic material having adhesive characteristics impregnating said fabric and adhering to said sheathing; and serving windings isolating the dielectric from the fabric and from the conductor.

2. A supporting and conducting cable comprising; a multi-stranded non-supporting conductor having extreme flexible characteristics and having a relatively short lay; a multi-stranded weight supporting sheathing encircling said conductor and having a relatively long lay; the conductor and sheathing being substantially concentrically related, and the lays of the sheathing and conductor extending in the same direction; a yieldable dielectric embracing the conductor and within the sheathing; a fabric interposed between the dielectric and sheathing; a semi-plastic material having adhesive characteristics impregnating said fabric and adhering to said sheathing; and serving windings isolating the dielectric from the fabric and from the conductor.

3. A method of constructing hoisting and conducting cable including; short lay winding a multiplicity of strands to form a conductor; applying insulation around the conductor; arranging a foraminous covering around the insulation; coating said covering with a semi-plastic sealing material; and long lay winding a multiple stranded weight supporting sheathing around said insulating covering in such a manner that the pressure exerted by the several strands against the coating impregnates the covering therewith.

4. A method of constructing hoisting and conducting cable including; wrapping an insulated conductor core with a foraminous covering; coating said covering with a normally semi-plastic material while in a plastic state; then compressing a multi-stranded weight supporting sheathing around the coating and utilizing the compressive force occasioned thereby to impregnate the coating into the covering.

5. A method of constructing well tool hoisting and controlling cables including; coating a partially foraminous inner lay with normally semi-plastic material while in a plastic state; then compressing a multi-stranded outer lay around the coating and utilizing the compressive force occasioned thereby to force the coating both into the foraminous portion of the inner lay and between the strands of the outer lay.

6. A hoisting cable for well tools comprising; a helical multi-stranded conductor; a helical stranded wire rope structure therearound; the lays of the conductor and wire rope structure extending in the same direction and the wire rope structure occupying at least one-half the diameter of the finished cable; a fabric interposed between the conductor and wire rope structure; and a semi-plastic material having adhesive characteristics impregnating said fabric and adhering to said wire rope structure.

7. A hoisting cable for well tools comprising; a helical multi-stranded non-supporting conductor having extreme flexible characteristics and having a relatively short lay; and a helical multi-stranded wire rope structure encircling said conductor and having a relatively long lay; the conductor and wire rope structure being substantially concentrically related, and the lays of the wire rope structure and conductor extending in the same direction, said wire rope structure occupying the major diameter of the cable, and a semi-plastic fluid-resistant insulating material between the concentric lays having adhesive characteristics.

8. A hoisting cable for well tools comprising; a helical multi-stranded non-supporting conductor having extreme flexible characteristics and having a relatively short lay; a helical multi-stranded wire rope structure encircling said conductor and having a relatively long lay; the conductor and wire rope structure being substantially concentrically related, and the lays of the wire rope structure and conductor extending in the same direction; a fabric interposed between the conductor and sheathing, said wire rope structure occupying the major diameter of the cable; and a semi-plastic material having adhesive characteristics impregnating said fabric and adhering to said wire rope structure.

9. A hoisting cable for well tools comprising; a core including, a dead annealed, multiple stranded conductor having a superficially loosely wound, short lay, and insulation therearound; a stranded wire rope structure around the insulation having a tight, compacted, relatively long lay; and a dense, conformable semi-plastic insulating and fluid-resistant material interposed between the insulation and sheathing, the strands of said wire rope structure occupying the major diameter of the cable.

10. A method of constructing hoisting and conducting cables including short lay winding a multiplicity of strands in a loose manner to form a conductor that permits superficial longitudinal compression; applying insulation thereabout; and long lay winding several multiple wire strands around the insulation to form a sheathing occupying the major diameter of the cable, the proportionate lay of said wire strands to the lay of the conductor strands being greater than the diameter of the wire strands to the diameter of the conductor strands.

11. A method of constructing hoisting and conducting cables including; short lay winding a multiplicity of strands in a loose manner to form a conductor that permits superficial longitudinal compression; applying an insulation thereabout; arranging a foraminous covering around the insulation; coating said covering with a semi-plastic sealing material; and long lay winding several multiple wire strands around the coating in such number and manner that the proportionate lay of the wire strands to the lay of the conductor strands is greater than the diameter of the wire strands is to the diameter of the conductor strands, the strands occupying the major diameter of the cable; and utilizing the compressive force exerted by the application of said strands to force the coating into the covering and between the strands of said sheathing.

12. A method of constructing hoisting and conducting cables including short lay winding a multiple stranded conductor; dead annealing the conductor; applying insulation around the conductor; arranging a foraminous covering around the insulation; coating said covering with a semi-plastic sealing material; long lay winding a stranded wire rope structure around said insulating covering, and utilizing the pressure exerted by the application of said strands against the coating to impregnate the covering therewith.

13. A method of constructing hoisting and conducting cables including; short lay winding a multi-stranded conductor in such a manner that the strands are slightly loose to permit superficial longitudinal compression; dead annealing the conductor; applying an insulation thereabout; long lay winding a multiple stranded supporting sheathing around the insulation in such a manner that the strands thereof are tight and compact, and having the lays of said conductor and sheathing extending in the same direction.

14. The method of manufacturing insulated conductor cable which consists in coating a conductor to provide a dielectrically strong covering, surrounding said conductor with superimposed layers of closely woven fabric, submerging the fabric wrapped conductor in a semi-plastic sealing compound, enclosing the compound covered structure within a weight-supporting lay of pre-formed strands of wire, and running said stranded lay through a forming die to impress the strands in the surface of the compounds.

15. The method of manufacturing insulated conductor cable including covering a conductor with a dielectric, surrounding the same with layers of closely woven fabric, submerging in a semi-plastic sealing compound, enclosing the compound covered structure in a weight-supporting lay of strands of wire, and running said stranded lay through a forming die to impress the strands in the surface of the compound and impregnate the fabric layers therewith.

16. In a hoisting and \conducting cable; a weight-supporting helical multi-stranded sheathing having the lays extending in the same direction, a core therein including a helical multi-stranded insulated conductor having a lower elastic limit than the sheathing and subject to some tension upon stretch of said sheathing, the sheathing exceeding the diameter of the core and the lays of the conductor extending in the same direction as the lays of the sheathing, and means in the cable to minimize the tension on the conductor within the range of the normal stretch and retraction of the sheathing.

17. In a hoisting and conducting cable, a weight-supporting helical multi-stranded sheathing having the lays extending in the same direction, a core therein including a helical multi-stranded insulated conductor that is highly flexible and non-elastic and subject to some tension upon stretch of the sheathing, the sheathing exceeding the diameter of the core and the lays of the conductor extending in the same direction as the lays of the sheathing, and means in the cable to minimize the tension on the conductor within the range of the normal stretch and retraction of the sheathing.

18. A hoisting cable for well tools comprising; an insulated multi-stranded laid conductor having superficial compressibility stranded wire rope sheathing laid thereover and occupying the major diameter of the completed cable; the lay of the wire rope strands being greater in proportion to the lay of the conductor than the diameter of the wire rope strands is to the diameter of the conductor so that tension applied to the sheathing tends to compress said conductor longitudinally to minimize the tension thereon.

19. A hoisting and conducting cable comprising a helical multi-stranded non-supporting conductor superficially wound with a relatively short lay, a helical multi-stranded wire rope structure compactly wound with a relatively long lay, the lays of the conductor and wire rope structure extending in the same direction with the wire rope structure occupying the major diameter of the cable, and a semi-plastic fluid resistant and insulating material surrounding the conductor and adhering to the wire rope structure.

WALTER T. WELLS.